United States Patent [19]

Sengoku et al.

[11] Patent Number: 4,884,498

[45] Date of Patent: Dec. 5, 1989

[54] CONTINUOUS DIGESTING APPARATUS

[75] Inventors: Koji Sengoku, Nara; Misao Tomita, Ishikawa, both of Japan

[73] Assignees: House Food Industrial Company Limited; Takai Tofu & Soymilk Equipment Co., both of Japan

[21] Appl. No.: 241,623

[22] Filed: Sep. 7, 1988

[30] Foreign Application Priority Data

Sep. 7, 1987 [JP] Japan ............................ 62-223649
Oct. 1, 1987 [JP] Japan ............................ 62-248478
Oct. 7, 1987 [JP] Japan ............................ 62-253315

[51] Int. Cl.⁴ .................................................. A47J 27/00
[52] U.S. Cl. ..................................... 99/352; 99/467; 366/101; 366/147; 366/340; 426/511
[58] Field of Search ................... 99/352, 481, 467; 366/144, 147, 101, 107, 340, 337; 426/510, 511; 422/307, 308

[56] References Cited

U.S. PATENT DOCUMENTS

| | | | |
|---|---|---|---|
| 2,125,245 | 7/1938 | McCray | 366/340 X |
| 2,585,793 | 2/1952 | Kruse | 426/510 X |
| 2,704,206 | 3/1955 | Crook | 366/340 X |
| 3,045,984 | 7/1962 | Cochran | 366/340 |
| 3,119,704 | 1/1964 | Harrell et al. | 366/101 X |
| 3,466,149 | 9/1969 | Blood et al. | 366/147 X |
| 4,073,226 | 2/1978 | Shulz | 99/427 |
| 4,112,131 | 9/1978 | Bosy et al. | 426/511 X |
| 4,160,002 | 7/1979 | Janovtchik | 99/467 X |
| 4,243,636 | 1/1981 | Shiraki et al. | 366/101 X |
| 4,581,238 | 4/1986 | White et al. | 426/511 X |
| 4,598,636 | 7/1986 | McGehee | 99/403 X |

FOREIGN PATENT DOCUMENTS

| | | |
|---|---|---|
| 211668 | 7/1988 | European Pat. Off. . |
| 21-2391 | 1/1946 | Japan . |
| 23-48673 | 7/1948 | Japan . |
| 36-22940 | 6/1961 | Japan . |
| 462391 | 1/1971 | Japan . |
| 61-22940 | 6/1986 | Japan . |
| WO87/06445 | 11/1987 | PCT Int'l Appl. . |
| 1449645 | 9/1976 | United Kingdom . |

Primary Examiner—Stephen Marcus
Assistant Examiner—Christine A. Peterson
Attorney, Agent, or Firm—Mason, Fenwick & Lawrence

[57] ABSTRACT

A continuous digesting apparatus for digesting a high viscous material such as a raw material for bean curd (for example, a Japanese food "tofu") or various kinds of soups. According to the digesting apparatus of the present invention, the digesting chamber is divided into a plurality of compartments by a plurality of partition plates each having a notch and therefore the raw material in each compartment can be sufficiently mixed and uniformly digested by the injected steam and the following raw material fed from the upstream compartment through the notch of the partition plate. This makes it possible the raw material to be uniformly heated and mixed. In addition, the partition plates can prevent the formation of bubbles of active ingredients such as protein included in the raw material and the discharge of the active ingredient from the discharging pipe.

4 Claims, 12 Drawing Sheets

(INVENTION) | (PRIOR ART)

CONTINUOUS DIGESTING APPARATUS

BACKGROUND OF THE INVENTION

The present invention relates to a continuous cooking apparatus i.e. a continuous digesting apparatus for digesting a high viscous material such as a raw material for bean curd (for example, a Japanese food "tofu") of various kinds of soups.

In general, it is called as "cooking" or "digesting" to gradually and uniformly heat from the room temperature to about 100° C. the high viscous material such as the raw material for "tofu" which is made from soybeans by grinding sodden soybeans or by watering powdered soybeans or pressed soybeans.

Heretofore, there has been used many digesting apparatus and heating apparatus and one of which is disclosed in Japanese Patent Publication No. 22,940/1986. The digesting apparatus of this Japanese Patent has a screw-conveyor shaped baffle plate and therefore the raw material fed to the digesting apparatus is passed therethrough without being subjected by any agitating and mixing action. This causes an uneven digestion due to difference in degree of digestion between the raw material near the steam cylinder and that away therefrom. Accordingly, it is impossible to manufacture "tofu" having excellent taste and construction. In addition, the digesting apparatus of this prior art has disadvantages that it cannot remove the bitterness such as saponin from the raw material by generating bubbles in the raw material and by discharging the bitterness constituent together with the bubbles since the digesting pipe of this apparatus is formed as a closed system and thus no outlet of the bubbles is formed in the apparatus.

Disclosed in Japanese Patent Publication No. 2,391/1971 is another digesting apparatus in which no baffle plate is provided in the steam cylinder. Accordingly, the raw material is passed through the apparatus without being subjected by any agitating and mixing action and therefore uneven digestion is caused therein. In addition, bubbles are formed in this apparatus by steam injected from a steam injecting pipe without being mixed with the raw material and the bubbles thus formed rise upward and are then discharged from an air drain pipe. This lowers the heating efficiency of this apparatus.

Other digesting apparatus of the prior art are disclosed, for example, in Japanese Laid-open Patent Publication No. 48,673/1973 and Japanese Patent Publication No. 22,940/1986. In these apparatus, since steam injecting apertures are uniformly arranged over the entire region of a steam injecting pipe, it is impossible to maintain the temperature of the raw material constant while the raw material is passed through the steam injecting pipe. Accordingly, the rapid increase of temperature is caused when the injection of steam is strong and on the contrary sufficient agitation and mixture of the raw material cannot be carried out when the injection of steam is weak. This causes the uneven digestion of the raw material and therefore lowers the taste of the finished food, for example: "tofu".

In these digesting apparatus of the prior art, the digestion is generally carried out by the centrally arranged steam injecting pipe having steam injecting apertures uniformly arranged over the entire region thereof. However, even if reducing the number of the steam injecting apertures toward the downstream side of the steam injecting pipe, the pressure and the temperature acting on the whole raw material would become always equal in any portion of the raw material due to the steam injected from a steam injecting pipe arranged downstream side. Also, the control of the temperature and the pressure acting on the raw material is carried out simultaneously and uniformly in every digesting chambers (compartments) although an individually independent control is required to each digesting chamber according to the degree of digestion i.e. the integrated residence time of the raw material in the digesting chambers. Excessive heat of the raw material is undesirable especially in the leaching of protein from the raw material.

SUMMARY OF THE INVENTION

Accordingly, it is a first object of the present invention to provide a continuous digesting apparatus which is able to solve the problem of uneven digestion, to remove the bitterness from the raw material, for example, of "tofu", and also to prevent the oxidization and deterioration of the raw material, temperature increasement due to the progress of digestion, and escape of active ingredients in the raw material due to an overflow of increased bubbles.

It is a second object of the present invention to provide a continuous digesting apparatus which is able to carry out a perfect digestion by sufficiently agitating and uniformly heating the raw material to avoid the uneven digestion and rapid temperature increasement of the raw material.

It is a third object of the present invention to provide a continuous digesting apparatus which has a plurality of digesting chambers and is able to independently control the temperature within each digesting chamber.

For achieving the first object of the present invention, there is provided a continuous digesting apparatus comprising a raw material digesting cylinder and a steam injecting pipe longitudinally and coaxially extending within said raw material digesting cylinder and formed with a plurality of steam injecting apertures characterized in that said continuous digesting apparatus comprising a plurality of partition plates each being formed with a notch and arranged in a space between said digesting cylinder and said steam injecting pipe to divide said space into a plurality of compartments so that said notches of mutually adjacent partition plates are alternately directed in a diametrically opposite direction each other; a raw material supplying port formed in the bottom of said digesting cylinder; a raw material discharging port arranged at a position lower than the top of said digesting cylinder by a predetermined distance; and a vapor discharging pipe communicated with the top of said digesting cylinder for discharging vapor and bubbles therefrom.

For achieving the second object of the present invention, there is provided a continuous digesting apparatus comprising a raw material digesting cylinder and a steam injecting pipe longitudinally and coaxially extending within said raw material digesting cylinder and formed with a plurality of steam injecting apertures characterized in that said continuous digesting apparatus comprising a plurality of partition plates each being formed with a notch and arranged in a space between said digesting cylinder and said steam injecting pipe to divide said space into a plurality of compartments; and said steam injecting pipe is not formed with any steam injecting aperture in at least one of said compartments.

For achieving the third object of the present invention, there is provided a continuous digesting apparatus comprising a raw material digesting cylinder and a steam injecting pipe longitudinally and coaxially extending within said raw material digesting cylinder and formed with a plurality of steam injecting apertures characterized in that said continuous digesting apparatus comprising a plurality of partition plates each being formed with a notch and arranged in a space between said digesting cylinder and said steam injecting pipe to divide said space into a plurality of compartments; a raw material supplying port formed in the lowermost compartment; a material discharging port formed in the uppermost compartment; and each of said compartments is independently supplied with steam via separate steam supplying pipes.

BRIEF DESCRIPTION OF THE DRAWINGS

Other objects and advantages of the present invention will become apparent from the following detailed description of preferred embodiments of the present invention taken in reference to the accompanying drawings in which:

FIGS. 9 ($a$) through ($d$) and ($a'$) through ($d'$) are drawings showing measured values of temperature respectively in the digesting apparatus of the present invention and that of the prior art;

FIGS. 15 ($a$), ($b$) and ($c$) are diagrams each showing a variation of a relation between time and temperature; and, FIG. 16 shows a further modification of the continuous digesting apparatus of FIG. 14.

DESCRIPTION OF THE PREFERRED EMBODIMENTS

Figure 1:
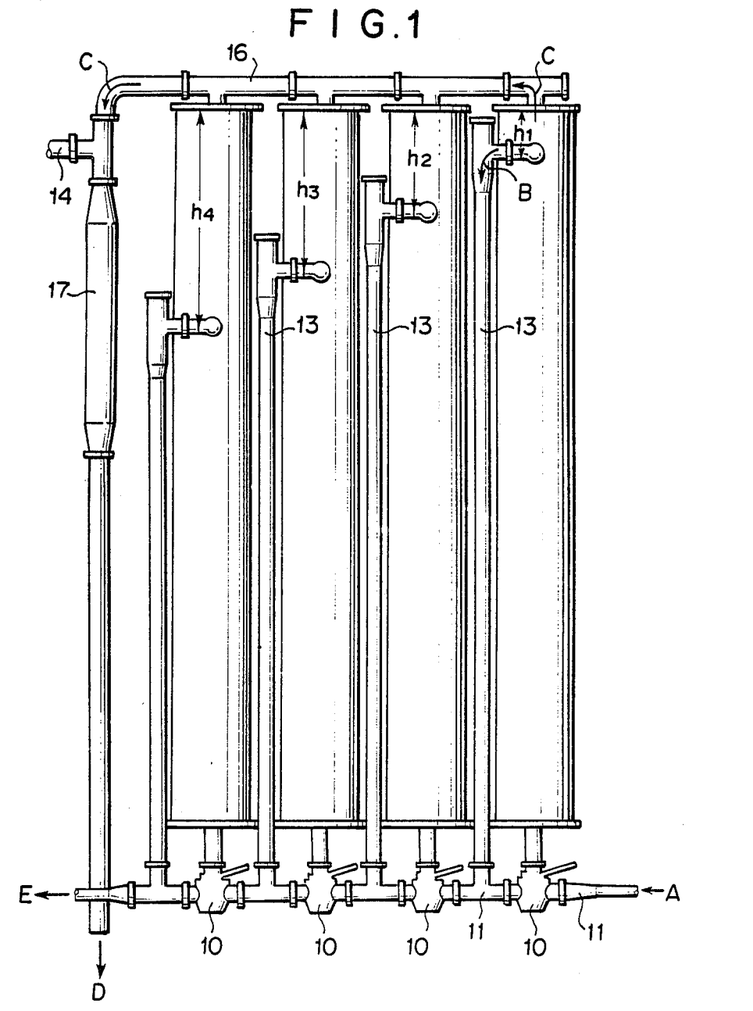
FIG. 1 is a front elevational view of a continuous digesting apparatus according to a first embodiment of the present invention.
Figure 2:
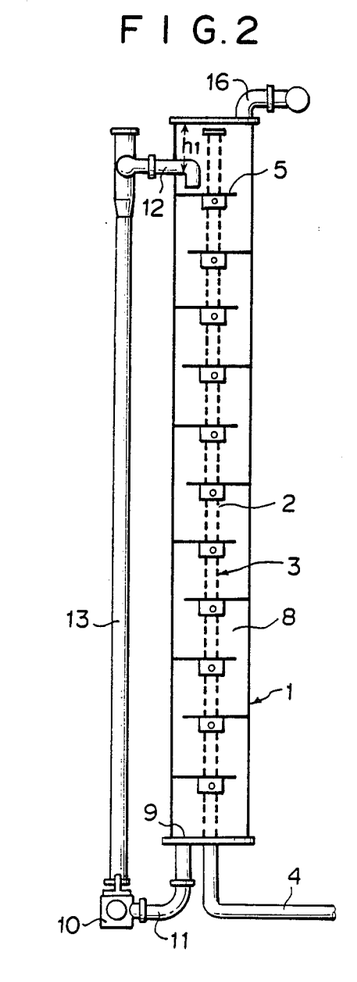
FIG. 2 is a partially sectional side elevation view of the continuous digesting apparatus of FIG. 1.
Figure 3:
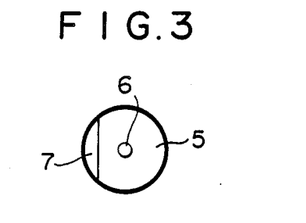
FIG. 3 is a plan view of a partition plate arranged within the continuous digesting apparatus of FIG. 1.

Referring to FIGS. 1 through 3, there is shown a first embodiment of a continuous digesting apparatus of the present invention for processing a raw material, for example, "tofu". As shown in FIG. 2, a vertical-typical digesting cylinder 1 having top and bottom plates is provided with a steam injecting pipe 3 which is coaxially arranged within the digesting cylinder 1 and which is formed with a large number of steam injecting apertures 2 around its cylindrical wall. The space between the digesting cylinder 1 and the steam injecting pipe 3 is divided into a plurality of compartments i.e. digesting chambers 8 (twelve compartments in the illustrated embodiment) by a plurality of partition plates 5. In order to improve the efficiency of mixing the raw material of food (e.g. "tofu"), it is preferable to set a ratio of the pitch of the partition plates 5 to the inside diameter of the digesting cylinder 1 within a range of 0.5:1–0.9:1. The partition plates 5 are arranged substantially at a constant pitch and substantially perpendicular to the axis of the digesting cylinder 1 and the steam injecting pipe 3. The steam injecting pipe 3 extends passing through an opening 6 formed in each partition plate 5.

As shown in FIG. 3, the partition plate 5 is formed as a disc having a diameter substantially same as the inside diameter of the digesting cylinder 1 and is also formed with a notch 7 cut in straight away from the periphery of the disc. It is preferable to set a ratio of the cross-sectional area of the digesting cylinder 1 to the area of the notch 7 within a range of 1:0.05–1:0.25. As best shown in FIG. 2, the partition plates 5 should be so arranged that said notches 7 of mutually adjacent partition plates 5 are alternately directed in a diametrically opposite direction each other so that the raw material of food flows within the digesting cylinder 1 with its flow direction alternately changed by the partition plates 5. The notch 7 may be formed as other configuration, for example, by providing an aperture in the partition plate 5 eccentrically from the center thereof.

The steam injecting pipe 3 is connected to a steam supplying pipe 4 through the bottom plate of the digesting cylinder 1. The bottom plate of the digesting cylinder 1 is provided with a raw material supplying port 9 to which the raw material is fed from a raw material feeding pump (not shown) through a raw material supplying pipe 11 and a three-way valve 10.

A material discharging port 12 is formed in the upper side wall of the digesting cylinder 1. As best shown in FIG. 1, a plurality of the digesting cylinders 1 can be connected in series with being arranged in a side-by-side relation. In this case, the distance $h_1$, $h_2$, $h_3$, $h_4$... of said raw material discharging port 12 from the top of each of said digesting cylinders 1 should be more larger as the digesting step is later. It is preferable to set a ratio of the overall height of the digesting cylinder 1 to the distance $h_1$, $h_2$, $h_3$, $h_4$... within a range of 1:0.05–1:0.5. In FIG. 1, the material flows from the right (earlier digesting step) to the left (later digesting step). The material discharging ports 12 are connected to their discharging pipes 13.

A vapor discharging pipe 16 is connected to each aperture formed in the top plate of each digesting cylinder 1. The vapor and bubbles discharged from the top of the digesting cylinder 1 through the vapor discharging pipe 16 are transferred to a condenser 17 and then discharged therefrom after having been condensed therein. A cooling water supplying pipe 14 is connected to the top of the condenser 17.

Figure 4:
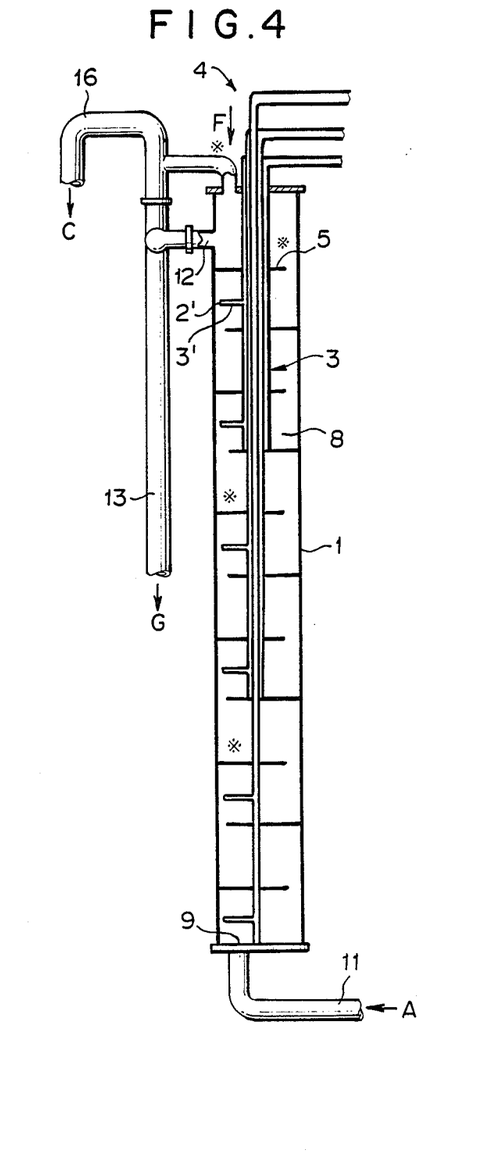
FIG. 4 is a partially sectional side elevation view of a continuous digesting apparatus according to a second embodiment of the present invention.

The continuous digesting apparatus shown in FIG. 4 has four digesting cylinders 1 arranged side-by-side, raw material supplying pipes 11 each being connected in series through the three-way valves 10, and the vapor discharging pipe 16 also connected in series relative to all the digesting cylinders 1.

Then the operation of the continuous digesting apparatus of the present invention will be described.

The steam supplied through the steam supplying pipe 4 is injected to the inside of each digesting cylinder 1 from the steam injecting pipe 3 and raises the temperature within the digesting cylinder 1 to a predetermined temperature. The setting of the temperature is carried out by controlling a solenoid valve (not shown) arranged at the intermediate of the steam supplying pipe 4 and operated in response to a signal from a thermo-control unit (not shown).

The raw material of "tofu" is fed to the first threeway valve 10 of the first digesting cylinder 1 from the raw material supplying pump as shown by an arrow A in FIG. 1. Then by actuating the first three-way valve 10 to open both its upward outlet port and side inlet port and to close its side outlet port, the raw material can be introduced into the first digesting cylinder 1. The raw material fed into the first digesting cylinder 1 is sufficiently mixed by the pumping force acting on the raw material from the underside thereof and the high pressure steam injected from the steam injecting apertures 2 of the steam injecting pipe 3. The mixed raw material then collides with the partition plates 5 and is spread by them and therefore the degree of mixture is further enhanced. Thus the raw material is uniformly heated over its entire volume and then is transferred to the second digesting cylinder 1 from the discharging port 12 through the discharging pipe or connecting pipe 13 and further through the second three-way valve 10.

At this time, the liquid level of raw material is positioned near the lower edge of the discharging port 12 and the space in the digesting cylinder 1 above the liquid level is filled with bubbles i.e. internal vapor generated from the raw material. These bubbles overflow through the vapor discharging pipe 16 as shown by arrows C and then are condensed by the condenser 17 and finally are discharged outside the digesting apparatus 1 as shown by an arrow D in FIG. 1. The temperature of the raw material are gradually raised by four digesting cylinders 1 and the measured values of temperature thereof at the raw material discharging ports 12 of the first, second, third and fourth digesting cylinders 1 were respectively about 50°, 75°, 90° and 100° C.

It can be seen, according to the digesting apparatus of the present invention, that the raw material is continuously heated, digested and pumped and the raw material finally and uniformly heated to about 100° C. is transferred to a next bean curd refuse/soybean milk separating process as shown by an arrow E in FIG. 1.

Then, a continuous digesting apparatus according to the second embodiment of the present invention will be described referring to FIGS. 4 through 12.

Similarly to the first embodiment, a raw material digesting cylinder 1 having top and bottom plates is vertically arranged as shown in FIG. 4. The digesting cylinder 1 is divided into a plurality of digesting chambers i.e. compartments 8 by a plurality of partition plates 5. Each of the partition plates 5 is formed with a notch which is similar to the notch 7 of the first embodiment and which is also arranged alternately in an opposite direction. A steam injecting pipe 3 is arranged within the digesting cylinder 1 coaxially therewith with being passed through a central opening formed in each partition plate 5.

The steam injecting pipe 3 is connected to a steam supplying pipe 4 through the top plate of the digesting cylinder 1. Particular distinction of the second embodiment different from the first embodiment resides in a provision of steam injecting branch pipes 3' and steam injecting apertures 2' formed at the tip of the branch pipes 3'. These branch pipes 3' and steam injecting apertures 2' can be provided instead of or in addition to the steam injecting pipes 3 and steam injecting aperture 3 shown in the first embodiment. These branch pipes 3' and apertures 2' can be arranged at alternate compartments 8 as shown in FIG. 4 or at every two or three compartments.

Figure 5:
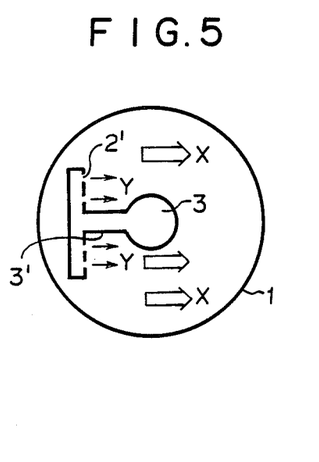
FIG. 5 through FIG. 8 are explanatory drawings each showing a relation between a flow direction of steam injected from a steam injecting apertures and a flow direction of raw material of food (e.g. "tofu")
Figure 6:
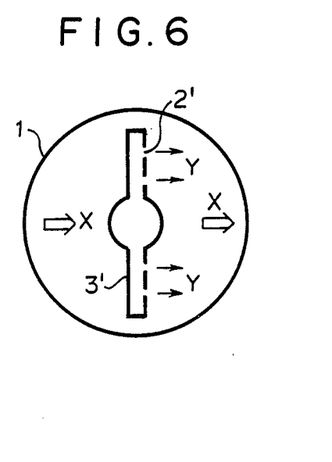
Figure 7:
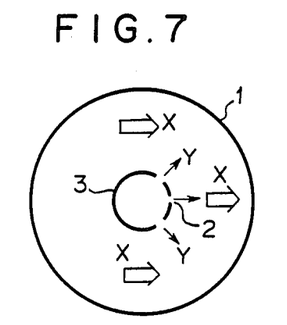
Figure 8:
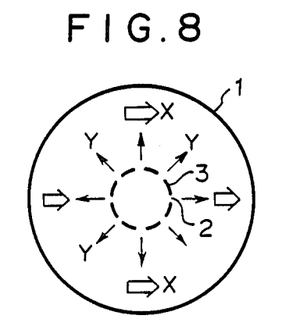

The configuration of the steam injecting branch pipe 3' may be T-shaped type (FIG. 5) or I-shaped type (FIG. 6). Examples shown in FIGS. 7 and 8 are that the steam injecting apertures 2 are formed in the wall of the central steam injecting pipe 3 similarly to the first embodiment. Arrows X and Y shown in FIGS. 5 through 8 show respectively the flow directions of the raw material and the steam. In the example of FIG. 5, the flow direction of the raw material and that of the steam injection are coincide with each other and thus it is most advantageous in suppressing the rapid increase of temperature of the raw material and in achieving the uniform heating of the raw material.

Similarly to the first embodiment, formed in the bottom plate of the digesting cylinder 1 is a raw material supplying port 9 to which a raw material supplying pipe 11 is connected. A material discharging port 12 is formed in the side wall of the digesting cylinder 1 at a position lower than the top of the digesting cylinder 1 by a predetermined distance. The discharging port 12 is connected to a raw material discharging pipe 13. A vapor discharging pipe 16 is connected both to the top plate of the digesting cylinder 1 and the top of the raw material discharging pipe 13 so that the vapor discharging pipe 16 can introduce the vapor and the bubbles generated both at the top of the digesting cylinder 1 and at the top of the raw material discharging pipe 13 to the condenser.

The above description of the second embodiment is made with reference to a single digesting cylinder 1, however, it is possible to arrange a plurality of digesting cylinders 1 in series similarly to the first embodiment.

The continuous digesting apparatus of the second embodiment operates as follows:

The raw material of food (e.g. "tofu") is fed by a pump through the raw material supplying pipe 11 as shown by an arrow A (FIG. 4) and then introduced into the digesting cylinder 1 through the port 9. Thus the raw material gradually flows upward within the digesting pipe 1 with being sinuously turned by the partition plates 5. On the other hand, the steam is supplied into the steam injecting pipe 3 and branch pipes 3' through the steam supplying pipe 4 as shown by an arrow F and then is injected into the digesting cylinder 1 from the steam injecting apertures 2'. The flow direction of the raw material is reversed in each compartment 8 by the partition plates 5 and the oppositely arranged notches 7 thereof. When the raw material collides with the partition plates 5 and the cylindrical wall of the digesting cylinder 1, it is spread by them and is completely mixed and heated by the pumping force and the injecting force of high pressure steam and finally discharged from the discharging pipe 13 as shown by an arrow G and transferred to a next processing step.

The liquid level of the raw material is positioned near the lower edge of the raw material discharging port 12 and the vapor and the bubbles filled within the digesting cylinder 1 above the liquid level are discharged through the vapor discharging pipe 16 to the condenser as shown by an arrow C and then are finally discharged outside the apparatus. Thus it is possible to continuously digest the raw material of food (e.g. "tofu") according to the present invention.

EXAMPLES OF EXPERIMENTS

The results of experiments obtained by comparing the continuous digesting apparatus of the present invention and that of the prior art are shown in FIGS. 9, 10, 11 and 12.

The specifications of the digesting apparatus used in the experiment are as follows. The inside diameter of the digesting cylinder 1:210 mm; the steam injecting branch pipe 3': T-shaped branch pipe (FIG. 5) having four steam injecting apertures per one compartment, the diameter of each steam injecting aperture being 1 mm; the distance between two adjacent partition plates: 80 mm; the opening ratio of the notch: 10%; the flow rate of the raw material: 4 kg; the vapor pressure: 0.55 kg/cm$^2$ (present invention's apparatus), 0.40 kg/cm$^2$ (prior art's apparatus).

Figure 9:
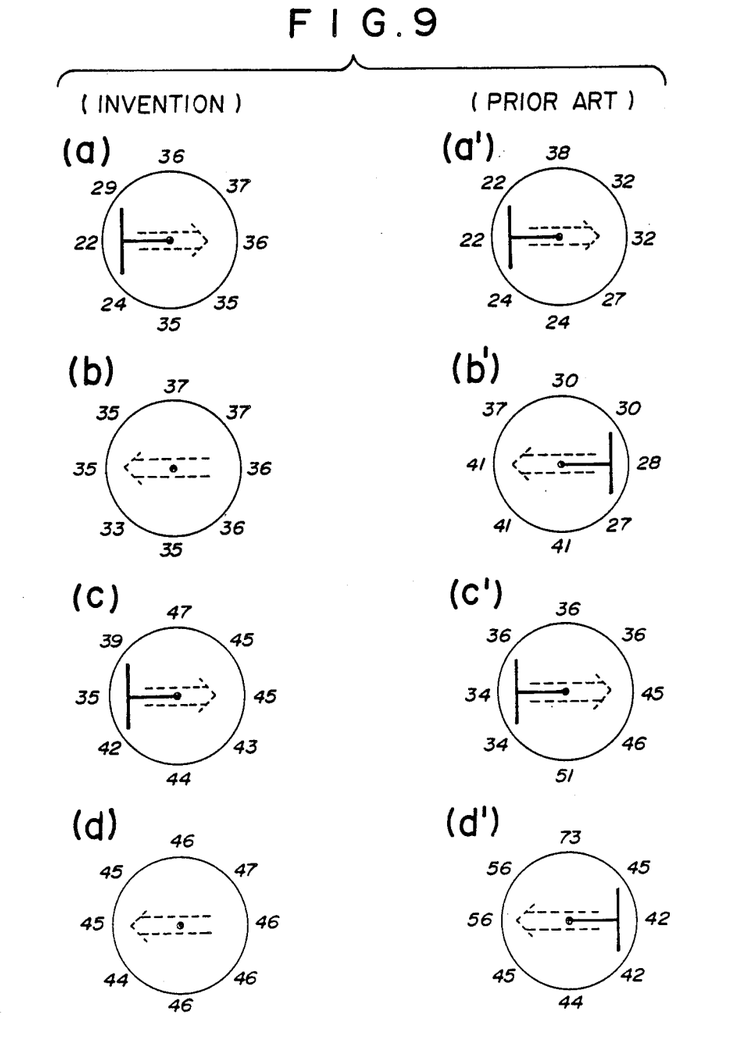

FIGS. 9 (a), (b), (c) and (d) show values of measured temperature (° C.) at eight points around each of different compartments 8 of the continuous digesting apparatus of the present invention and FIGS. 9 (a'), (b'), (c') and (d') show values of measured temperature (° C.) at similar eight points around each of different compartments of the continuous digesting apparatus of the prior art (i.e. a first comparative example). An arrow of dotted lines in each drawing of FIG. 9 shows the flow direction of the raw material and it can be seen that the flow direction changes continuously. Comparing the temperature distribution of them from these drawings, it can be seen that the temperature difference in the apparatus of the present invention is much less than that of the prior art. In FIG. 9, it is shown that the lower the drawings, the more progressed the processing steps. Comparing the lowermost FIGS. 9 (d) and (d') of the most progressed step, it will be obvious that there is a remarkable difference between the present invention and the prior art.

Figure 10:
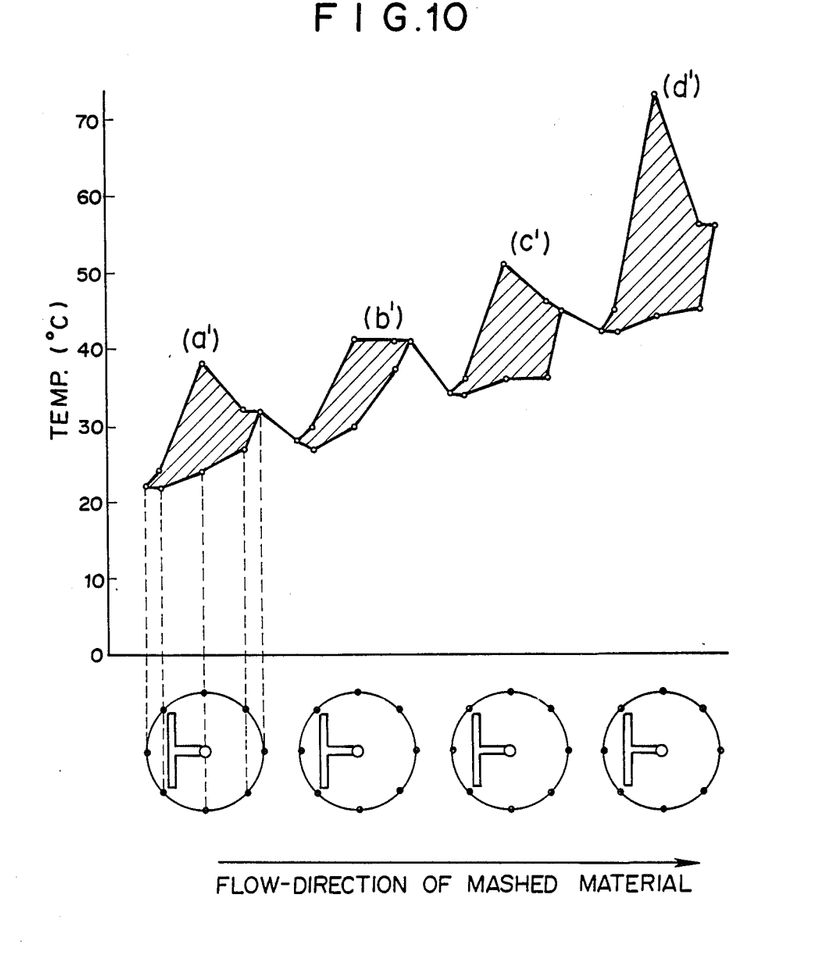
FIG. 10 is a diagram showing a temperature rising pattern of the prior art's apparatus shown in FIG. 9.

FIG. 10 is a diagram showing a temperature rising pattern of the first comparative example shown in FIGS. 9 (a')–(d') wherein the ordinate indicates the temperature (° C.) and the abscissa indicates the flow direction of the raw material. This diagram shows the large area portions (hatched portions) formed by connecting the plotted points with straight lines. This means the presence of remarkable difference of temperature in the same compartment in the apparatus of the prior art.

Figure 11:
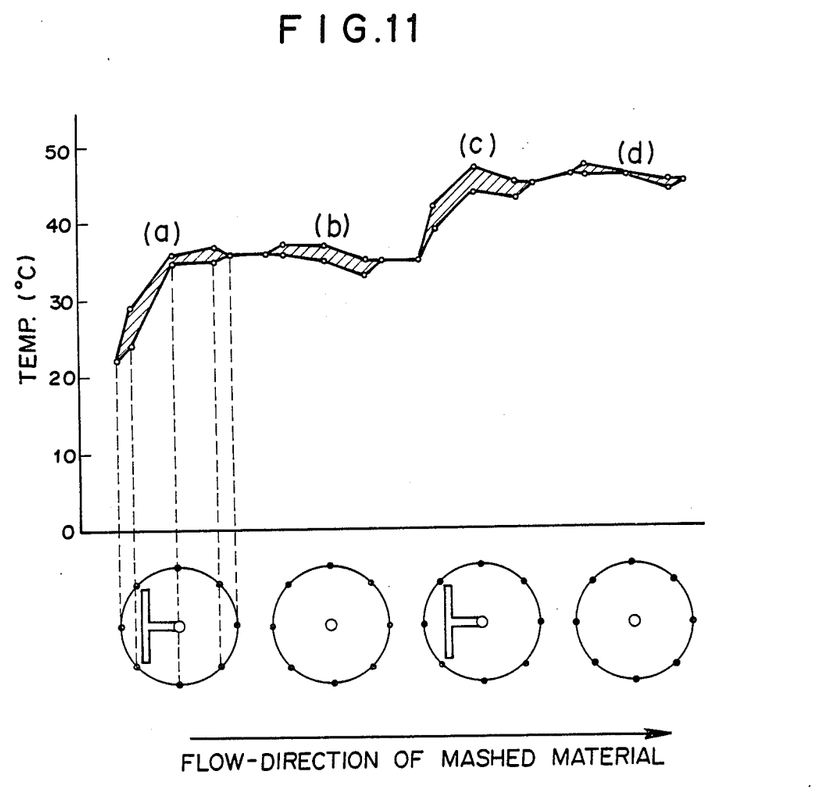
FIG. 11 is a diagram showing a temperature rising pattern of the present invention's apparatus shown in FIG. 9.

FIG. 11 is a diagram as to the present invention showing a temperature rising pattern similar to FIG. 10. According to FIG. 11, the area of hatched portions is small and this means the uniform temperature distribution in the same compartment in the apparatus of the present invention.

Figure 12:
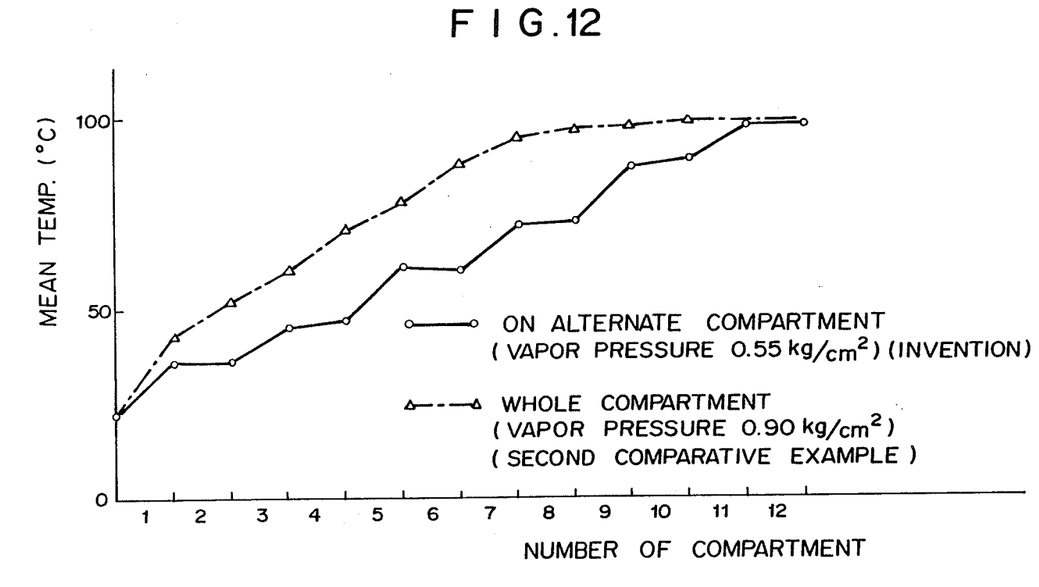
FIG. 12 is a diagram showing the temperature in each digesting chamber (compartment) of the present invention's apparatus and a second comparative example.

FIG. 12 is a diagram showing the mean temperatures in each compartment of the present invention's apparatus and the prior art's apparatus (a second comparative example) wherein the ordinate indicates the mean temperature (° C.) at the outlet (shown by a mark "*" in FIG. 4) of each compartment and the abscissa indicates the number of the compartments. In FIG. 12, a plotted line shown by marks " " indicates the present invention and a plotted line shown by marks "Δ" indicates the prior art. There are provided with the steam injecting branch pipes 3' in all compartments both in the present invention's apparatus and the prior art's apparatus and the vapor pressures thereof are respectively 0.40 and 0.90 kg/cm$^2$. As can be seen from the diagram of FIG. 12, the digesting apparatus of the present invention does not cause the rapid temperature increase and is possible to moderate heating and digesting operations. The experiment of FIG. 12 has been carried out under following conditions that is, the final heating temperature: 98° C.; the volume of the digesting cylinder: 33 l; and the flow rate of the raw material: 4 kg/min.

Then "tofu" having soybean solids content of 10.5 weight-% was made from soybean milk separated from bean curd refuse manufactured from raw materials under the methods of the present second embodiment, the first comparative example and the second comparative example by cooling the soy milk to 15° C., then by adding G.D.L of 0.25 weight-% (relative to the soybean milk) into the soybean milk and mixing thereafter, and finally heating and coagulating it at 90° C. for 60 minutes after having contained it in a plastic container and sealed therein. The hardness of the finished "tofu" is measured by using a tester "RE0 METER" (a trade mark of FUDOH INDUSTRIES CO., LTD., plunger diameter: 8 mm, elevating velocity: 6 cm/min) and the result of which is as follows (Table 1).

TABLE 1

| | Hardness | Taste (palate) |
|---|---|---|
| Present invention | 76 g | Having moderate hardness and elasticity |
| First comparative example | 31 g | Soft and having no elasticity |
| Second comparative example | 47 g | Soft and having no elasticity |

Finally a third embodiment of the present invention will be described with reference to FIGS. 13 through 16.

Figure 13:
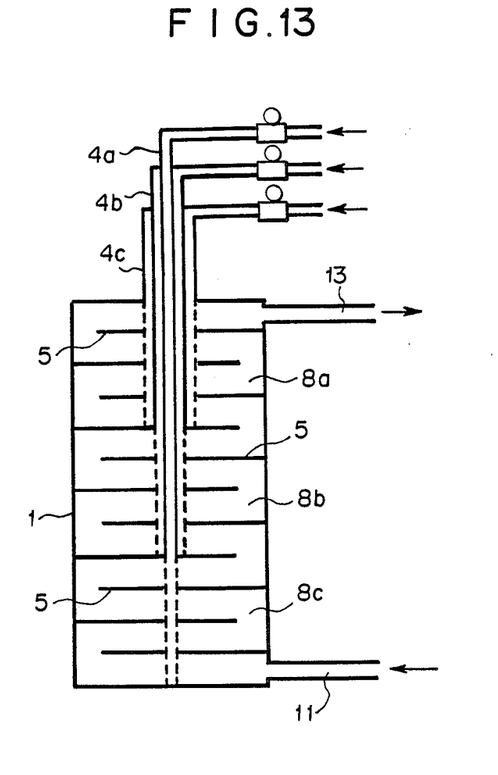
FIG. 13 is a sectional side elevation view schematically showing a continuous digesting apparatus according to a third embodiment of the present invention.

In FIG. 13, a numeral 1 denotes a raw material digesting cylinder, 4a, 4b, 4c . . . denote steam supplying pipes coaxially arranged each other, 5 denotes a partition plate, 8a, 8b, 8c . . . denote compartments, 11 denotes a raw material supplying pipe, and 13 denotes a raw material discharging pipe.

According to the digesting apparatus of the third embodiment, the raw material in each compartment 8a, 8b, 8c . . . is independently and controlably heated by steam separately supplied through the steam supplying pipes 4a, 4b, 4c . . .

Figures 14A, 14B:
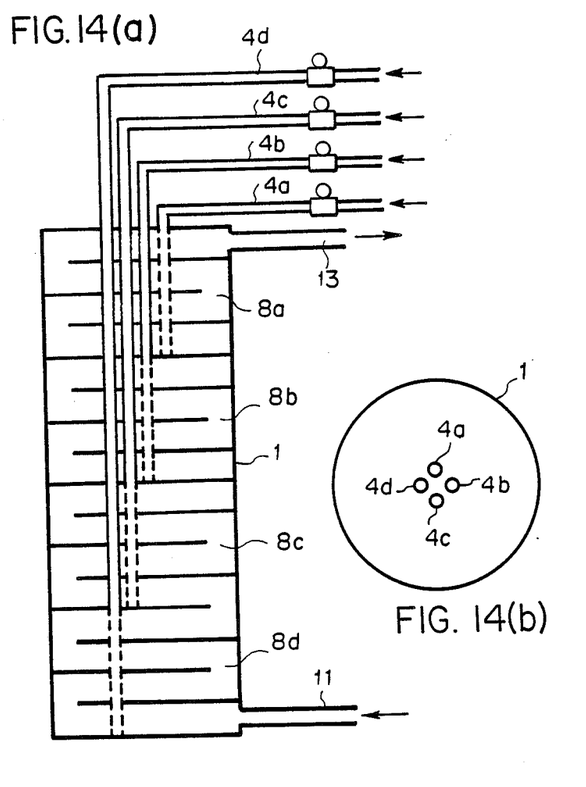
FIG. 14 is a sectional side elevation view schematically showing a modification of the continuous digesting apparatus of FIG. 13.
Figure 16:
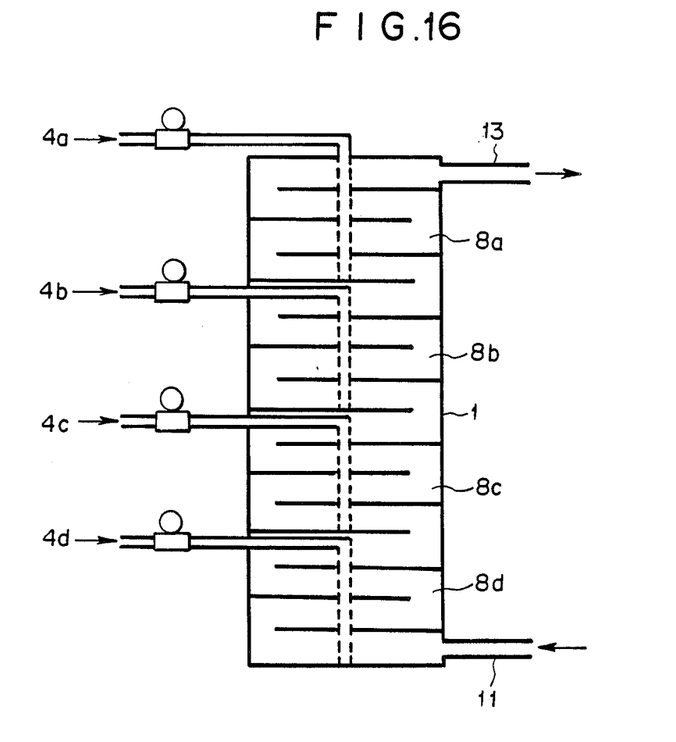

FIGS. 14 (a) and (b) show a third embodiment of the present invention wherein a plurality of the steam supplying pipes 4a, 4b, 4c, 4d . . . are passed through the top plate of the digesting cylinder 1 but are not arranged in a coaxial form. The mutual arrangement of the steam supplying pipes 4a, 4b, 4c, 4d . . . is clearly shown in FIG. 14 (b). FIG. 16 shows the further modification of the digesting apparatus shown in FIGS. 13 and 14 wherein the steam supplying pipes 4a, 4b, 4c, 4d . . . are introduced into each compartment 8a, 8b, 8c 8d with being passed through the side wall of the digesting cylinder 1. Of course, both the modified digesting apparatus in FIGS. 14 and 16 can also controlably and independently heat the raw material in each compartment 8a, 8b, 8c, 8d . . . by separate steam supplying pipes 4a, 4b, 4c, 4d . . . .

The control of digestion can be freely changed based upon the residence time of the raw material in the digesting cylinder 1 in accordance with the kinds of foods and the manufacturer's taste.

Figure 15:
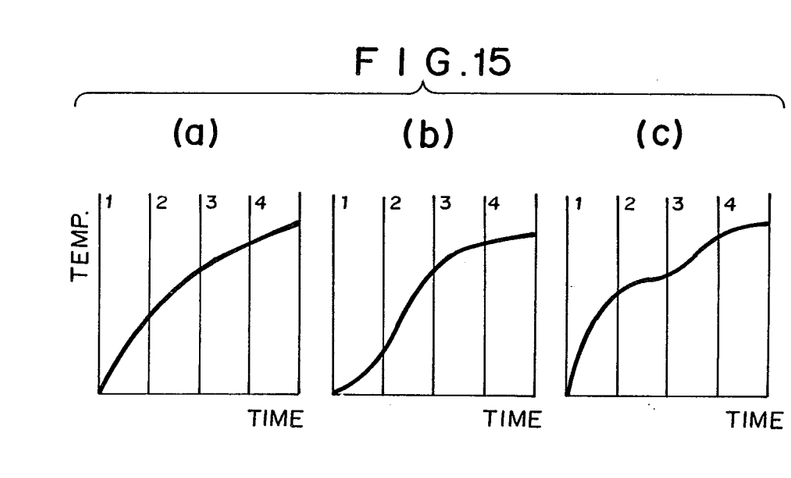

FIGS. 15 (a), (b) and (c) show digesting curves wherein the ordinate indicates the temperature of the steam and the abscissa indicates the residence time of the raw material in the digesting cylinder. FIG. 15 (a) shows a method in which the amount of the steam is gradually reduced in the order of 1, 2, 3 and 4.

FIG. 15 (b) shows a method in which the amount of the steam is reduced at 1 and then maximized at 2 and gradually reduced again at 3 and 4.

FIG. 15 (c) shows a method in which the amount of the steam is maximized at 1 and reduced at 2 and then maximized again at 3 and reduced at 4.

The advantages of the digesting apparatus of the present invention are as follows.

According to the first embodiment of the present invention, it is possible to prevent the uneven digestion since the raw material in each compartment can be sufficiently mixed and uniformly digested by the injected steam and the following raw material fed from the upstream compartment through the notch of the partition plate. The heating efficiency can be also improved since the partition plates suppress the generation of bubbles from the injected steam and the rise of them and thus the complete mixing of the steam and the raw material can be obtained.

In addition, the partition plates can prevent the formation of bubbles of active ingredients such as protein included in the raw material as well as the discharge of the active ingredient from the discharge pipe. On the contrary, since the bubbles of bitterness ingredients such as saponin have high stability and therefore their rise in the digesting cylinder and discharge therefrom are not suppressed by the partition plates, the bitterness ingredient can be efficiently removed from the raw material.

Since the raw material discharging port in each digesting cylinder is so positioned that the space for bubbles is formed above the top of the raw material and therefore the raw material is prevented from the contact with the ambient air, it is possible to prevent the raw material from the oxidization thereof and the deterioration of flavor.

In usual, the digesting temperature becomes high and the generation of bubbles is activated as the digesting process is progressed. This promotes the overflow of the bubbles and therefore the discharge of the active ingredients. However, according to the present invention, the large volume of space is formed in the top of the digesting cylinder for holding the bubbles. Thus, it is possible to prevent the overflow of bubbles and therefore the discharge of the active ingredients.

According to the second embodiment of the present invention, the digesting apparatus includes some compartments which are not provided with any steam injecting aperture. In addition to the advantages of the first embodiment, the provision of such compartment makes it possible to prevent the raw material from the rapid temperature increase. This, in turn, makes it possible to uniformly and moderately change the protein contained in the raw material and therefore to provide the food ("tofu") with the moderate hardness and elasticity pleasant to the palate.

According to the third embodiment of the present invention, since the steam supply into each compartment can be independently controlled, it is possible to properly heat the raw material according to the degree of digestion and also possible to achieve the uniform and perfect digestion thereof. It is further possible to control the degree of digestion according to the kinds of foods.

While preferred embodiments of this invention have been described in detail, it will be understood that various modifications and alternations of the digesting apparatus without departing from the spirit and scope of the invention, as set forth in the appended claims

What is claimed is:

1. A continuous digesting apparatus comprising a plurality of material digesting cylinders mutually connected in series, a plurality of steam injecting pipes, each of said steam injecting pipes longitudinally and coaxially extending within one of said raw material digesting cylinders and each of said steam injecting pipes being formed with a plurality of steam injecting apertures, said continuous digesting apparatus further comprising a plurality of partition plates each being formed with a notch and arranged in a space between each of said digesting cylinders and each of said steam injecting pipes to divide said space into a plurality of compartments so that said notches of mutually adjacent partition plates are alternately directed in a diametrically opposite direction to each other, a raw material supplying port formed in the bottom of each of said digesting cylinders, a material discharging port arranged at a position lower than the top of each of said digesting cylinders by a predetermined distance, the distance of said material discharging port from the top of each of said digesting cylinders being larger as the digesting step is later, and a vapor discharging pipe communicated with the top of each of said digesting cylinders for discharging vapor and bubbles therefrom.

2. A continuous digesting apparatus comprising a raw material digesting cylinder and a steam injecting pipe longitudinally and coaxially extending within said raw material digesting cylinder and formed with a plurality of steam injecting apertures, said continuous digesting apparatus further comprising a plurality of partition plates each being formed with a notch and arranged in a space between said digesting cylinder and said steam injecting pipe to divide said space into a plurality of compartments, and said steam injecting pipe is not formed with any steam injecting aperture in at least one of said compartments, said compartments formed with said steam injecting apertures and said compartments not formed with any steam injecting apertures being alternately arranged with each other.

3. A continuous digesting apparatus comprising a raw material digesting cylinder and a steam injecting pipe longitudinally and coaxially extending within said raw material digesting cylinder and formed with a plurality of steam injecting apertures, said continuous digesting apparatus further comprising a plurality of partition plates each being formed with a notch and arranged in a space between said digesting cylinder and said steam injecting pipe to divide said space into a plurality of compartments, a raw material supplying port formed in the lowermost compartment, a material discharging port formed in the uppermost compartment, and each of said compartments is independently supplied with steam via separate steam supplying pipes.

4. A continuous digesting apparatus as set forth in claim 3, wherein said steam supplying pipes are coaxially arranged with each other so that they pass through the top of the digesting cylinder and the largest diameter pipe of them is connected to the uppermost compartment and a next large diameter pipe is connected to a second upper compartment and so on.

* * * * *